Patented June 16, 1953

2,642,363

UNITED STATES PATENT OFFICE 2,642,363

PROCESS FOR CANNING WHOLE
FRESH MILK

John C. Moeri, New Orleans, La., assignor to Farm
Fresh Milk Corporation, Miami, Fla., a corporation of Florida No Drawing. Application January 23, 1952,
Serial No. 267,909

5 Claims. (Cl. 99—185)

This invention relates to an improved process for the canning of whole fresh milk.

The principal object of the invention is the provision of an efficient and novel process for canning whole fresh milk in such a manner that the canned product will be uniform in consistency and will keep almost indefinitely in any climate.

A further object of the invention is the provision of a process for canning whole fresh milk which results in a canned product that does not have an objectionable cooked taste or odor.

A still further object of the invention is the provision of a process of treating and canning whole fresh milk which includes effective sterilization and vacuum packing contributing to the satisfactory taste characteristics of the milk.

A still further object of the invention is the provision of a method of sterilizing whole fresh milk so that it may be kept indefinitely without suffering any deterioration and at the same time retaining the natural sweetness and the flavor of the original product.

With the foregoing and other objects in view which will appear as the description proceeds, the invention resides in the combination of steps and processes comprising the complete process disclosed herein, it being the intention to cover all changes and modifications of the example of the invention herein chosen for purposes of the disclosure, which do not constitute departures from the spirit and scope of the invention.

The present invention resides primarily in a process by which whole sweet milk is treated and canned under certain controlled conditions which result in the ability of the canned product to withstand deterioration and to retain its natural sweet flavor, taste and odor.

In accordance with the present invention, a given quantity of good quality milk of a minimum butter fat content of 3.5% is pasteurized and homogenized with a minimum homogenizing pressure of 2800 p. s. i., the milk retaining substantially the pasteurizing temperature of 163° F. and is immediately transferred to a can filling mechanism. The can filling mechanism delivers the milk to containers such as cans which are pre-treated to suitably condition them for the reception of the milk. A satisfactory conditioning treatment may comprise the subjection of the cans to a power spray of water incorporating chlorine at a ration of 250 parts chlorine to one million parts water. Subsequent rinsing in clear water and a subsequent heating of the cans is then indicated as, for example, by a plurality of jets of dry, strained steam from whence the cans are immediately delivered to the can filling mechanism.

The preferred apparatus for handling the cans incorporates an enclosure protecting the cans against contamination after their cleansing and preferably includes germicidal lamps to insure the delivery of sterilized cans to the can filling mechanism.

In carrying out the process, the milk is delivered to the cans at 163° F. and when the cans are almost filled they are subjected to a plurality of jets of strained, dry steam directed against the tops of the cans to provide the heat necessary to maintain the 163° F. temperature and to pull a vacuum of 9 to 10½ inches in the cans. The cans are then immediately sealed.

In continuing the steps of the process of canning whole milk, the filled and sealed cans are placed in spaced relation to one another in baskets which are in turn positioned in a suitable sterilizer retort arranged for moving the baskets of cans and enclosing the same. The minimum temperature in the sterilizer retort is 75° F. The sterilizer retort is then closed except for a vent which enables the subsequent introduction of live steam to vent entrapped air from the sterilizer retort.

The filled and closed cans in the baskets in the retort are moved constantly and live steam continues to enter the sterilizer retort to raise the temperature about the cans therein to 180° F. whereupon the vent is closed. Live steam continues to enter the sterilizer retort after the closing of the vent until a temperature between 238° F. to 240° F. is reached. The elapsed time consumed in raising the temperature within the retort is approximately ten minutes. After the temperature in the retort reaches the 238° F. to 240° F. the temperature is maintained for 14 minutes during which time the cans are continually moved. The 14 minute period comprises the principal sterilization cycle.

At the end of the sterilization cycle a cooling cycle is initiated by the introduction of cold water into the sterilizer retort until the temperature of the water in the retort is reduced to 100° F. The cold water is introduced into the retort at a rate enabling the reduction to be achieved in ten minutes. The cans are then removed from the sterilizer retort and subjected to a further cooling as, for example, in an ice cooling tank for an additional 15 minutes and whereby the temperature of the cans is reduced to 50° F.

It will occur to those skilled in the art that it is necessary to provide suitable increased pressure on the cans in the retort to prevent them from bursting and that such pressure as may be necessary may be achieved by the introduction of the live steam under a desired pressure. Alternately, other heating means may be employed and the pressure established by a compressed air source or the like. Upon the conclusion of the initial cooling cycle wherein the temperature of the cans is reduced to approximately 100° F., the pressure may be restored to atmospheric.

It will thus be seen that the milk being canned is initially heated to 163° F. during the pasteurization cycle and homogenized at the same temperature under relatively high pressure and then introduced at the same temperature into cans which have been previously sterilized and heated. Immediately upon the filling of the cans and prior to the closing thereof, the cans and their contents are subjected to the steam jets for the purpose of adding the additional heat required to retain pasteurization temperature and to create a vacuum in the can as hereinbefore set forth whereupon the cans are closed. It will thus be seen that the milk and the cans are relatively sterile at the time of closing of the cans.

The steps following the closing of the cans include the progressive heating of the cans to raise the temperature of the same from 163° F. to a maximum of 240° F. and at a time not exceeding ten minutes. The principal sterilization cycle then follows with the cans being held at 238° F. to 240° F. for an additional 14 minute period as hereinbefore set forth and at the termination thereof the temperature is rapidly reduced to 100° F. in a period of time not exceeding 10 minutes and immediately following the initial cooling, the temperature of the cans is further reduced to 50° F. in an additional period of time not exceeding 15 minutes.

It will thus be seen that the herein described process of canning whole fresh milk avoids the cooking of the milk and thereby avoids imparting a cooked taste to the same. The sterilization temperatures and times utilized are such that the milk is heated sufficiently to destroy any bacteria therein but carefully controlled to avoid actually cooking the milk. This is believed possible due to the determination of the critical temperatures and times involved and these in turn are made possible by the preliminary steps of pasteurizing the milk and holding the temperature thereof during the steps immediately prior to the actual canning thereof.

Furthermore, the actual canning of the milk takes place under controlled conditions forestalling the contamination of the milk at that point in the process and under conditions eliminating the possibility of any air being entrapped in the cans.

Those skilled in the art will recognize that these points are novel in view of the previous attempts to can whole fresh milk and the invention disclosed herein accordingly resides in the process and these several critical points of time and temperature are necessary thereto.

It will occur to those skilled in the art that the temperatures and times given are approximate and that certain tolerances in both temperatures and times are permissible within small limits. It will also occur to those skilled in the art that the pressure maintained on the cans during the principal sterilization cycle may vary somewhat as long as it is sufficient to withstand any pressure developed in the cans by the heat.

It will thus be seen that a practical and efficient method of canning whole fresh milk has been disclosed which results in the milk retaining its normal fresh taste, flavor and odor in addition to the ability to remain sweet for an indefinite period of time and thereby meets the several objects of the invention.

Having thus described my invention, what I claim is:

1. The process of canning whole fresh milk which comprises pasteurizing the milk at approximately 163° F., homogenizing the milk at 2800 p. s. i. and at approximately pasteurization temperature, delivering the milk to sterilized cans at pasteurization temperature and simultaneously applying heat to maintain the milk at said pasteurizing temperature and create a vacuum in said cans and sealing the same, and directly thereafter subjecting the cans containing the milk to a progressively increasing temperature to achieve a maximum temperature of the milk of 240° F. within a period of 10 minutes, subsequently holding the milk at a maximum of 240° F. for approximately 14 minutes and then reducing said temperature to approximately 100° F. within 10 minutes and subsequently further reducing the temperature to approximately 50° F. within an additional 15 minutes.

2. The process of canning whole fresh milk set forth in claim 1 wherein the vacuum created in the said cans is approximately 9 inches.

3. The process of canning whole fresh milk which comprises pasteurizing the milk at approximately 163° F., homogenizing the milk with a minimum pressure of 2800 p. s. i. and at pasteurization temperature, delivering the milk to sterilized cans at pasteurization temperature and sealing the same and directly thereafter subjecting the cans containing the milk to a progressively increasing temperature to achieve a maximum temperature of the milk of 240° F. within a period of 10 minutes, subsequently holding the milk at a maximum of 240° F. for approximately 14 minutes and then reducing said temperature to approximately 100° F. within 10 minutes and subsequently further reducing the temperature to approximately 50° F. within an additional 15 minutes.

4. The process of canning whole fresh milk which comprises subjecting the milk to certain critical temperatures for certain critical lengths of time as follows: heating the milk to 163° F. and homogenizing the same at high pressure, placing the milk in containers at said temperature and closing said containers and immediately thereafter progressively increasing the temperature of the milk from 163° F. to a maximum of 240° F. and within 10 minutes, holding said milk at said maximum temperature of 240° F. for an additional 14 minutes and immediately reducing the temperature of said milk to 100° F. within 10 minutes and immediately further reducing the temperature of said milk to 50° F. in the following 15 minutes.

5. The process of canning whole fresh milk as set forth in claim 4 and wherein the milk is deposited in containers and a vaccum of at least 9 inches created in said containers at the time of closing.

JOHN C. MOERI.

References Cited in the file of this patent

UNITED STATES PATENTS

| Number | Name | Date |
|---|---|---|
| 1,646,671 | Webb | Oct. 25, 1927 |
| 2,049,591 | Rafn | Aug. 4, 1936 |